Nov. 10, 1931.  A. K. BARR  1,831,586

HOSE NOZZLE

Filed Feb. 16, 1929

Inventor
Andrew K. Barr
By Fred Gerlach his Atty.

Patented Nov. 10, 1931

1,831,586

UNITED STATES PATENT OFFICE

ANDREW K. BARR, OF WAUKEGAN, ILLINOIS

HOSE NOZZLE

Application filed February 16, 1929. Serial No. 340,377.

The present invention relates generally to hose nozzles for use in washing automobiles and other such structures having finished surfaces. More particularly the invention relates to that type of hose nozzle which comprises a socket at one end and a tubular discharge member at the other end and is formed of elastic material so that it will not scratch or mar the various finished surfaces when they are struck inadvertently by either of the two parts of the nozzle.

One object of the present invention is to provide a hose nozzle of the aforementioned type which is an improvement upon previously designed nozzles of a similar character in that it embodies a metallic sleeve which fits in and is surrounded by the socket and is provided with a female screw thread for detachable connection with the male thread of a hose coupling member.

Another object of the invention is to provide a hose nozzle of the character under consideration in which the socket is provided with an integral shoulder for engaging the end of the hose coupling member and the inner end of the metallic sleeve is extended and embedded in the shoulder so that a rigid connection is effected for the sleeve.

A further object of the invention is to provide an elastic hose nozzle which is generally of new and improved construction, may be produced at a comparatively low cost and is extremely durable.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views.

Figure 1:
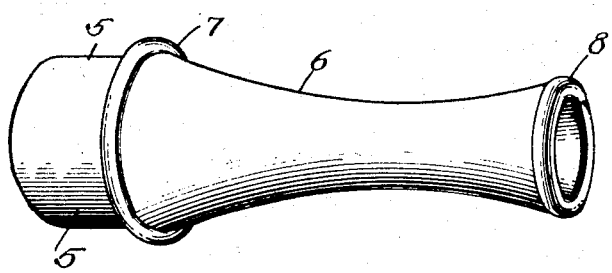
Figure 1 is a perspective of a hose nozzle embodying the invention.
Figure 2:
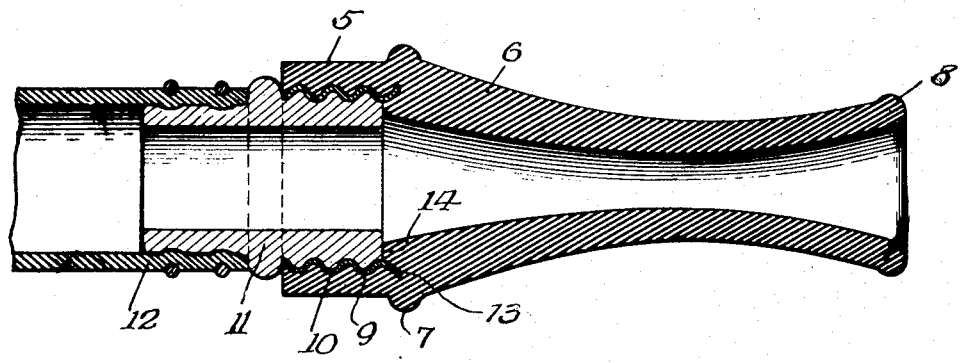
Figure 2 is a longitudinal section, illustrating in detail the manner in which the metallic sleeve is protected by the socket and is adapted for connection to a hose coupling member.
Figure 3:
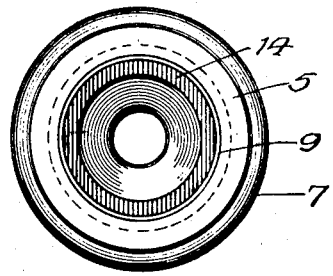
Figures 3 and 4 are end views.
Figure 4:
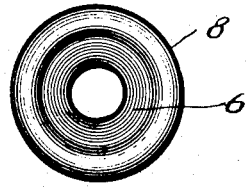

The invention is exemplified in a nozzle-body comprising a socket 5 and a tubular discharge member 6 integral with the socket and of suitable elastic material, such as a rubber compound, generally used in the manufacture of hose, which is of sufficient density to cause the nozzle to retain its normal shape in use with water under pressure, but sufficiently soft to prevent the material from scratching or marring the finished or polished surfaces of an automobile. By thus forming the nozzle-body of elastic material, it will not, when carelessly used by workmen, cause the finished surfaces to be marred or scratched. A bead 7 is integrally formed with the elastic body for convenience in holding and handling the nozzle. A bead 8 is integrally formed with the body at the outer end of the nozzle. The discharge member may be of any suitable shape, but is preferably flared adjacent its outer end to spray the water over the surface being washed. A metal sleeve 9, which may be of sheet metal, is fixedly secured in and completely surrounded by the socket 5 and has a female screw-thread 10 to engage the male thread of a metal coupling 11 which is of usual construction and attached to a hose 12. The sleeve may be moulded in the elastic body, and has an extension 13 embedded in the portion of the body adjacent the front of the socket. An annular shoulder 14 is integrally formed in the elastic body and adapted to engage the front end of the coupling member 11, so that when the nozzle is screwed tight on the coupling, the shoulder will be clamped against the outer end of the coupling to form a water-tight closure. This dispenses with the necessity of providing a separate elastic washer between the coupling and the nozzle.

The invention exemplifies a hose nozzle which can be produced at a low cost and is adapted for use in washing automobiles without danger or likelihood of scratching or marring the finished surfaces. By securing a metallic screw-thread in the socket, the nozzle is adapted for ready connection to the usual hose coupling and no metallic surfaces are exposed. By forming an elastic shoulder integral with the nozzle body to engage the end of the metallic coupling member, a separate washer between the nozzle and the coupling member is made unnecessary.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A hose nozzle comprising a socket at one end and a tubular discharge member at the other end, said socket and discharge member being integral with one another and formed of elastic material, and a metallic sleeve provided with a female screw thread whereby the nozzle may be detachably connected to the male thread of a hose coupling member, said sleeve being secured in and surrounded completely by the socket so that it is encased by elastic material and cannot injure any surface against which the nozzle may be struck.

2. A hose nozzle comprising a socket at one end and a tubular discharge member at the other end, the socket and nozzle being integral with one another and formed of elastic material, said socket being provided with an integral shoulder for engagement with one end of a hoses coupling member, and a metallic sleeve secured in and completely surrounded by the socket and provided with a female screw thread whereby the nozzle may be detachably connected to a male thread on the coupling member, the inner end of said sleeve being provided with an extension embedded in the shoulder portion of the socket and adapted to connect the sleeve fixedly in place.

Signed at Waukegan, Illinois, this 28th day of January, 1929.

ANDREW K. BARR.